(12) United States Patent
Gammill et al.

(10) Patent No.: US 8,007,000 B2
(45) Date of Patent: Aug. 30, 2011

(54) INFLATABLE AIRBAG ASSEMBLY WITH AN INFLATOR BRACKET

(75) Inventors: Kurt Gammill, Layton, UT (US); Blake Cheal, Perry, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 12/683,911

(22) Filed: Jan. 7, 2010

(65) Prior Publication Data

US 2011/0163521 A1    Jul. 7, 2011

(51) Int. Cl.
*B60R 21/16*    (2006.01)
(52) U.S. Cl. .................................................. 280/730.2
(58) Field of Classification Search ............... 280/730.2, 280/728.2
See application file for complete search history.

(56) References Cited

U.S. PATENT DOCUMENTS

| | | | |
|---|---|---|---|
| 5,092,628 A | 3/1992 | Tamura et al. |
| 5,944,342 A | 8/1999 | White et al. |
| 6,082,761 A | 7/2000 | Kato et al. |
| 6,224,089 B1 | 5/2001 | Uchiyama et al. |
| 6,260,878 B1 | 7/2001 | Tanase |
| 6,279,944 B1 | 8/2001 | Wipasuramonton et al. |
| 6,293,581 B1 | 9/2001 | Saita et al. |
| 6,447,003 B1 | 9/2002 | Wallentin et al. |
| 6,450,529 B1 | 9/2002 | Kalandek et al. |
| 6,497,429 B2 | 12/2002 | Matsumoto |
| 6,749,216 B2 | 6/2004 | Tanase et al. |
| 6,783,148 B2 * | 8/2004 | Henderson ................. 280/728.2 |
| 6,805,374 B2 | 10/2004 | Saderholm et al. |
| 6,811,184 B2 | 11/2004 | Ikeda et al. |
| 6,860,506 B2 | 3/2005 | Ogata et al. |
| 6,866,292 B2 | 3/2005 | Thomas |
| 7,077,424 B2 | 7/2006 | Inoue |
| 7,090,243 B2 | 8/2006 | Igawa |
| 7,140,639 B2 | 11/2006 | Hayashi et al. |
| 7,152,876 B2 | 12/2006 | Hofmann |
| 7,195,280 B2 | 3/2007 | Wheelwright et al. |
| 7,213,839 B2 | 5/2007 | Lockwood |
| 7,243,941 B2 | 7/2007 | Charpentier et al. |
| 7,396,042 B2 | 7/2008 | Mabuchi et al. |
| 7,404,572 B2 | 7/2008 | Salmo et al. |
| 7,677,595 B2 * | 3/2010 | Dominissini et al. ...... 280/728.2 |
| 7,699,340 B2 | 4/2010 | Okuhara et al. |

(Continued)

FOREIGN PATENT DOCUMENTS

EP    1508486    6/2009

(Continued)

OTHER PUBLICATIONS

Office Action mailed Sep. 15, 2010 in co-pending U.S. Appl. No. 12/417,357, now published as U.S. Publication No. US-2010/0253055.
Co-pending U.S. Appl. No. 12/552,878, titled Integrated Airbag Closing and Inflator Mounting Members for Inflatable Airbag Assemblies, filed Sep. 2, 2009.
Restriction Requirement mailed Dec. 27, 2010 in co-pending U.S. Appl. No. 12/552,878.

(Continued)

*Primary Examiner* — Faye M. Fleming
(74) *Attorney, Agent, or Firm* — Sally J. Brown; Stoel Rives LLP

(57) ABSTRACT

Inflatable curtain airbags can be attached to an inflator at a throat portion of the airbag. The attachment of the inflator to the throat portion may be mediated by an inflator mounting bracket. An extended portion of the inflator mounting bracket can protrude through an aperture in the throat portion to provide an anti-rotation function as well as a retention function.

25 Claims, 14 Drawing Sheets

U.S. PATENT DOCUMENTS

| | | |
|---|---|---|
| 7,789,414 B2 | 9/2010 | Blackburn |
| 7,883,112 B2 | 2/2011 | Wold et al. |
| 2003/0090093 A1 | 5/2003 | Ikeda et al. |
| 2003/0132615 A1 | 7/2003 | Henderson |
| 2004/0150202 A1 | 8/2004 | Goto |
| 2005/0001415 A1 | 1/2005 | Charpentier et al. |
| 2005/0134022 A1 | 6/2005 | Noguchi et al. |
| 2006/0108777 A1 | 5/2006 | Mabuchi et al. |
| 2006/0244244 A1 | 11/2006 | Blackburn |
| 2009/0039627 A1 | 2/2009 | Yokota |
| 2009/0134607 A1 | 5/2009 | Okuhara et al. |
| 2010/0207368 A1 | 8/2010 | Weyrich |
| 2010/0253055 A1 | 10/2010 | Schneider et al. |
| 2011/0049848 A1 | 3/2011 | Walston et al. |

FOREIGN PATENT DOCUMENTS

| | | |
|---|---|---|
| JP | 2005104176 | 4/2005 |
| WO | WO-2011/028684 | 3/2011 |

OTHER PUBLICATIONS

Notification of Transmittal of the International Search Report and the Written Opinion of the International Searching Authority issued Oct. 28, 2010 in International Application No. PCT/US2010/047250.

Amendment and Response to Office Action filed Mar. 15, 2011 in co-pending U.S. Appl. No. 12/417,357, now published as U.S. Publication No. US 2010/0253055.

Amendment and Response to Requirement of Election of Species filed Jan. 27, 2011 in co-pending U.S. Appl. No. 12/552,878, now published as U.S. Publication No. U.S. 2011/0049848.

Office Action mailed Feb. 28, 2011 in co-pending U.S. Patent Appl. No. 12/552,878, now published as U.S. Publication No. US 2011/0049848.

Notification of Transmittal of the International Search Report and the Written Opinion of the International Searching Authority issued Feb. 01, 2011 in International Application No. PCT/US2011/020469.

* cited by examiner

INFLATABLE AIRBAG ASSEMBLY WITH AN INFLATOR BRACKET

TECHNICAL FIELD

The present disclosure relates generally to the field of automotive protective systems. More specifically, the present disclosure relates to inflatable curtain airbags.

BRIEF DESCRIPTION OF THE DRAWINGS

The present embodiments will become more fully apparent from the following description and appended claims, taken in conjunction with the accompanying drawings. Understanding that the accompanying drawings depict only typical embodiments, and are, therefore, not to be considered to be limiting of the disclosure's scope, the embodiments will be described and explained with specificity and detail in reference to the accompanying drawings.

It will be readily understood that the components of the embodiments as generally described and illustrated in the figures herein could be arranged and designed in a wide variety of different configurations. Thus, the following more detailed description of various embodiments, as represented in the figures, is not intended to limit the scope of the disclosure, as claimed, but is merely representative of various embodiments. While the various aspects of the embodiments are presented in drawings, the drawings are not necessarily drawn to scale unless specifically indicated.

The phrases "connected to," "coupled to" and "in communication with" refer to any form of interaction between two or more entities, including mechanical, electrical, magnetic, electromagnetic, fluid, and thermal interaction. Two components may be coupled to each other even though they are not in direct contact with each other. The term "abutting" refers to items that are in direct physical contact with each other, although the items may not necessarily be attached together.

Inflatable airbag systems are widely used to minimize occupant injury in a collision scenario. Airbag modules have been installed at various locations within a vehicle, including, but not limited to, the steering wheel, the instrument panel, within the side doors or side seats, adjacent to the roof rail of the vehicle, in an overhead position, or at the knee or leg position. In the following disclosure, "airbag" may refer to an inflatable curtain airbag, overhead airbag, front airbag, or any other airbag type.

Inflatable curtain airbags may be used to protect the passengers of a vehicle during a side collision or roll-over event. Inflatable curtain airbags typically extend longitudinally within the vehicle and are usually coupled to or next to the roof rail of the vehicle. The inflatable curtain airbag may expand in a collision scenario along the side of the vehicle between the vehicle passengers and the side structure of the vehicle. In a deployed state, an inflatable curtain airbag may cover at least a portion of side windows and a B-pillar of the vehicle. In some embodiments, inflatable curtain airbags may extend from an A-pillar to a C-pillar of the vehicle. In alternative embodiments, inflatable curtain airbags may extend from the A-pillar to a D-pillar of the vehicle.

Inflatable curtain airbags are typically installed adjacent to the roof rail of a vehicle in an undeployed state, in which the inflatable curtain airbag is rolled or folded or a combination thereof and retained in the folded or rolled configuration by being wrapped at certain points along the airbag. In this state, the airbag may be said to be in a packaged configuration. When deployed, the airbag exits the packaged configuration and assumes an extended shape. When extended and inflated, the airbag may be said to comprise a deployed configuration.

Figure 1A:
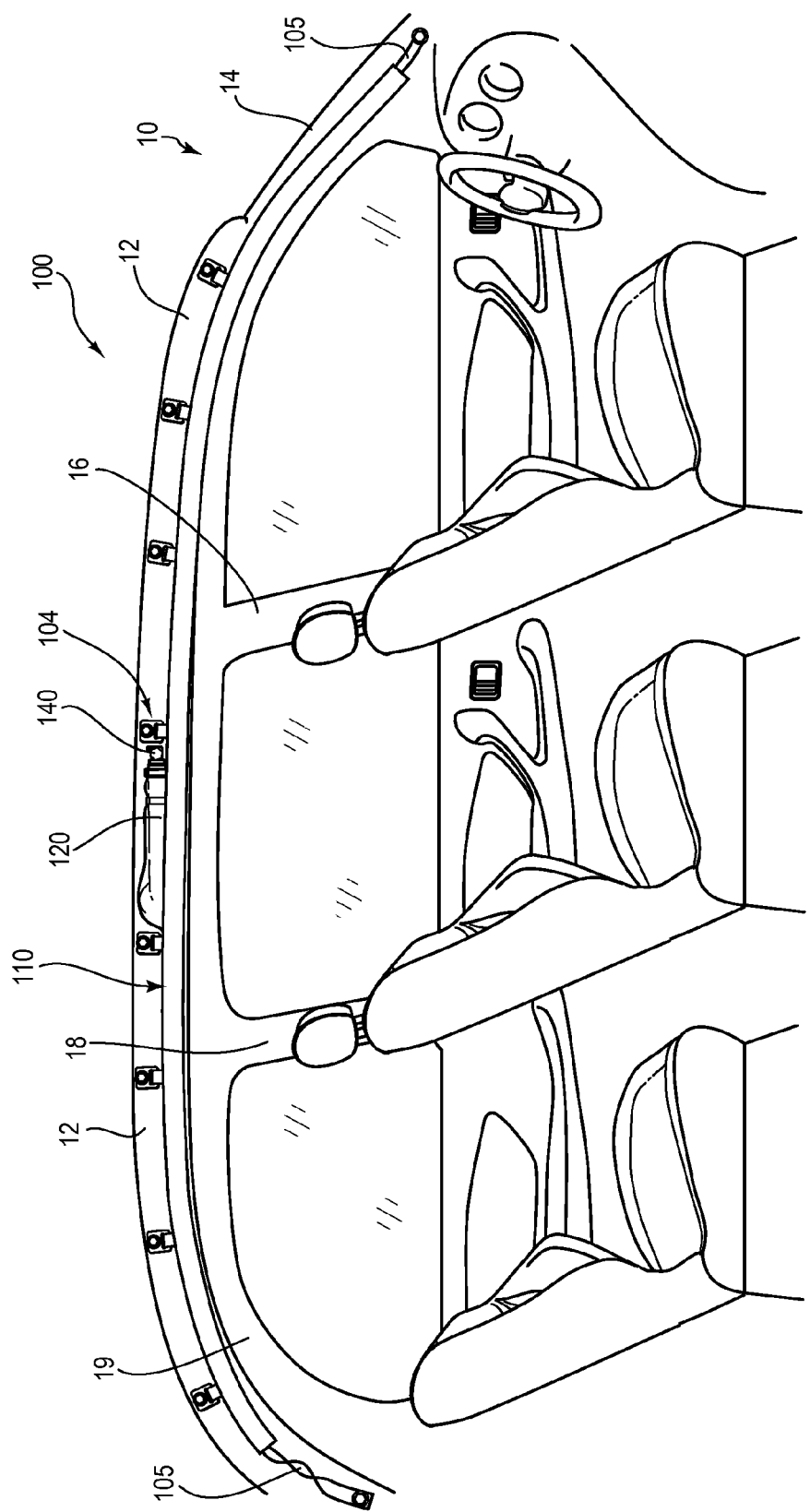
FIG. 1A is a perspective view of one embodiment of an airbag assembly, wherein the airbag assembly comprises a mounting assembly that is coupled to an inflatable curtain airbag, wherein the mounting assembly is configured to retain the airbag in a packaged configuration.

FIG. 1A depicts airbag assembly 100 from a perspective view, wherein an inflatable curtain airbag 110 that is in a packaged configuration and is mounted adjacent a vehicle roof rail 12. Airbag assembly 100 may comprise inflatable curtain airbag 110, and an inflator 140, coupled to a throat portion 120 of the airbag. Assembly 110 may further comprise one or more external tethers 105. In the depicted embodiment, airbag 110 is an inflatable curtain airbag cushion, which extends from an A-pillar 14 to a D-pillar 19. Inflatable curtain airbag 110 also extends past a B-pillar 16 and a C-pillar 18 such that in a deployed configuration, the curtain airbag at least partially covers the B- and C-pillars, as depicted in FIG. 1B.

Figure 1B:
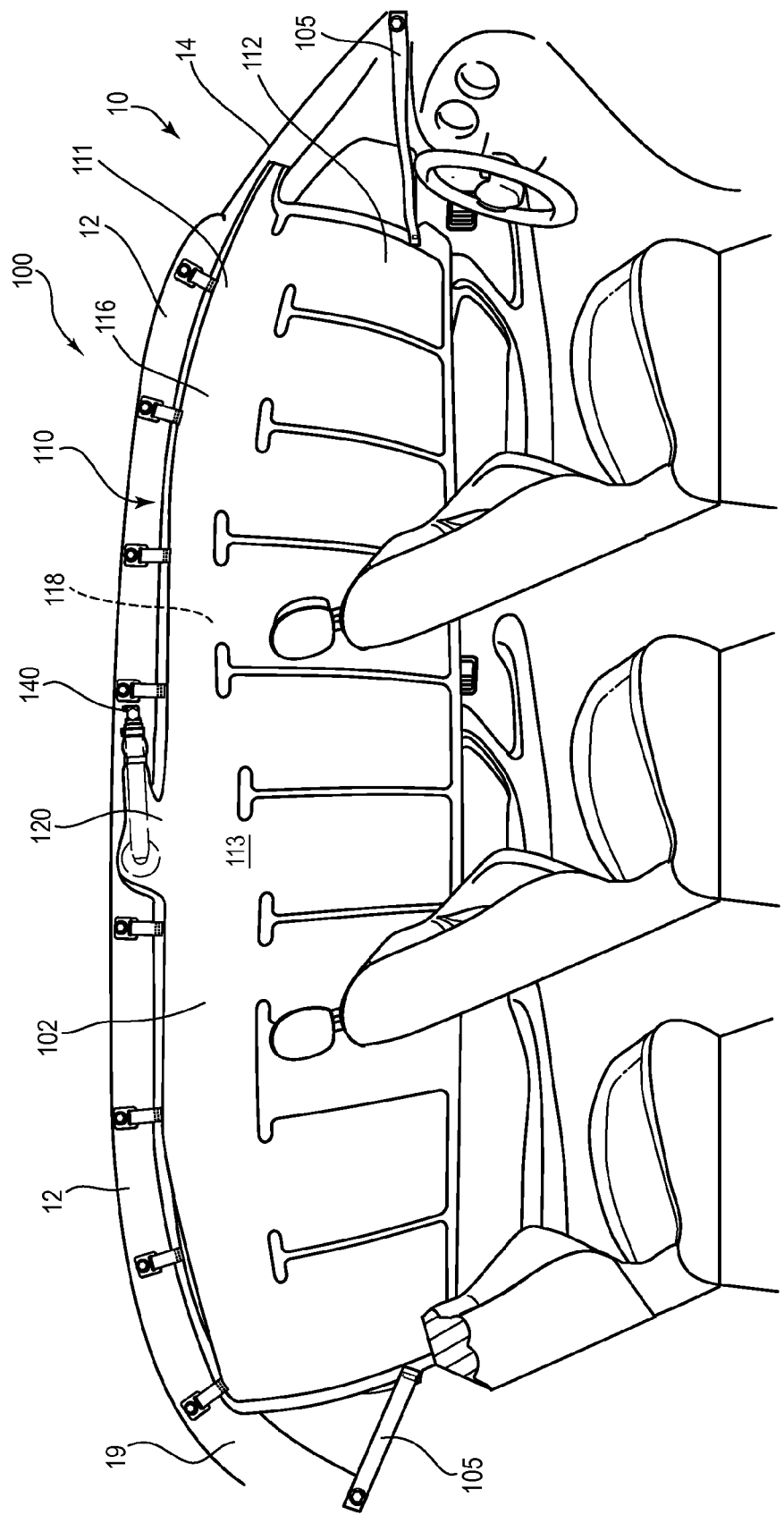
FIG. 1B is a perspective view of the airbag assembly of FIG. 1A, wherein the inflatable curtain airbag is in a deployed configuration.

FIG. 1B is a perspective view of assembly 100, wherein inflatable curtain airbag 110 is depicted in a deployed configuration. Inflatable curtain airbag 110 is configured to become inflated upon activation of one or more inflators such that the inflatable curtain airbag transitions from the packaged configuration to the deployed configuration. Inflatable curtain airbag 110 may be described as having an upper portion 111, a lower portion 112, a first face 113, a second face (not visible), and a throat portion 120, which may also be called an inflator attachment portion. The throat portion may be closed around an inflator, and the inflator mounted to the roof rail of the vehicle via an inflator mounting bracket. The various faces of inflatable curtain airbag 110 define an interior inflatable void 118, which is in fluid communication with the inflator. Inflatable void 118 may be divided into inflation cells. The various faces of inflatable curtain airbag 110 may comprise panels of a woven nylon fabric that are coupled together at a seam.

Upper portion 111 of inflatable curtain airbag 110 is the portion of the curtain airbag that is closest to the headliner of a vehicle when the airbag is in a deployed state. Lower portion 112 is below upper portion 111 when inflatable curtain airbag 110 is in a deployed state, and is closest to a floor of the vehicle. The term "lower portion" is not necessarily limited to the portion of inflatable curtain airbag 110 that is below a horizontal medial plane of the inflatable curtain airbag, but may include less than half, more than half or exactly half of the bottom portion of the inflatable curtain airbag. Likewise, the term "upper portion" is not necessarily limited to the portion of inflatable curtain airbag 110 that is above a horizontal medial plane of the inflatable curtain airbag, but may include less than half, more than half or exactly half of the top portion of the inflatable curtain airbag.

As will be appreciated by those skilled in the art, a variety of types and configurations of inflatable curtain airbag membranes can be utilized without departing from the scope and spirit of the present disclosure. For example, the size, shape, and proportions of the airbag membrane may vary according to its use in different vehicles or different locations within a vehicle such that the airbag may comprise an inflatable curtain cushion; a rear passenger side airbag; a driver's airbag; and/or a front passenger airbag. Also, the airbag may comprise one or more of any material well known in the art, such as a woven nylon fabric, which may be coated with a substance, such as silicone. Additionally, the airbag cushion may be manufactured using a variety of techniques such as one piece weaving, cut and sew, or a combination of the two techniques. Further, the cushion membrane may be manufactured using sealed or unsealed seams, wherein the seams are formed by stitching, adhesive, taping, radio frequency welding, heat sealing, or any other suitable technique or combination of techniques.

Figure 2:
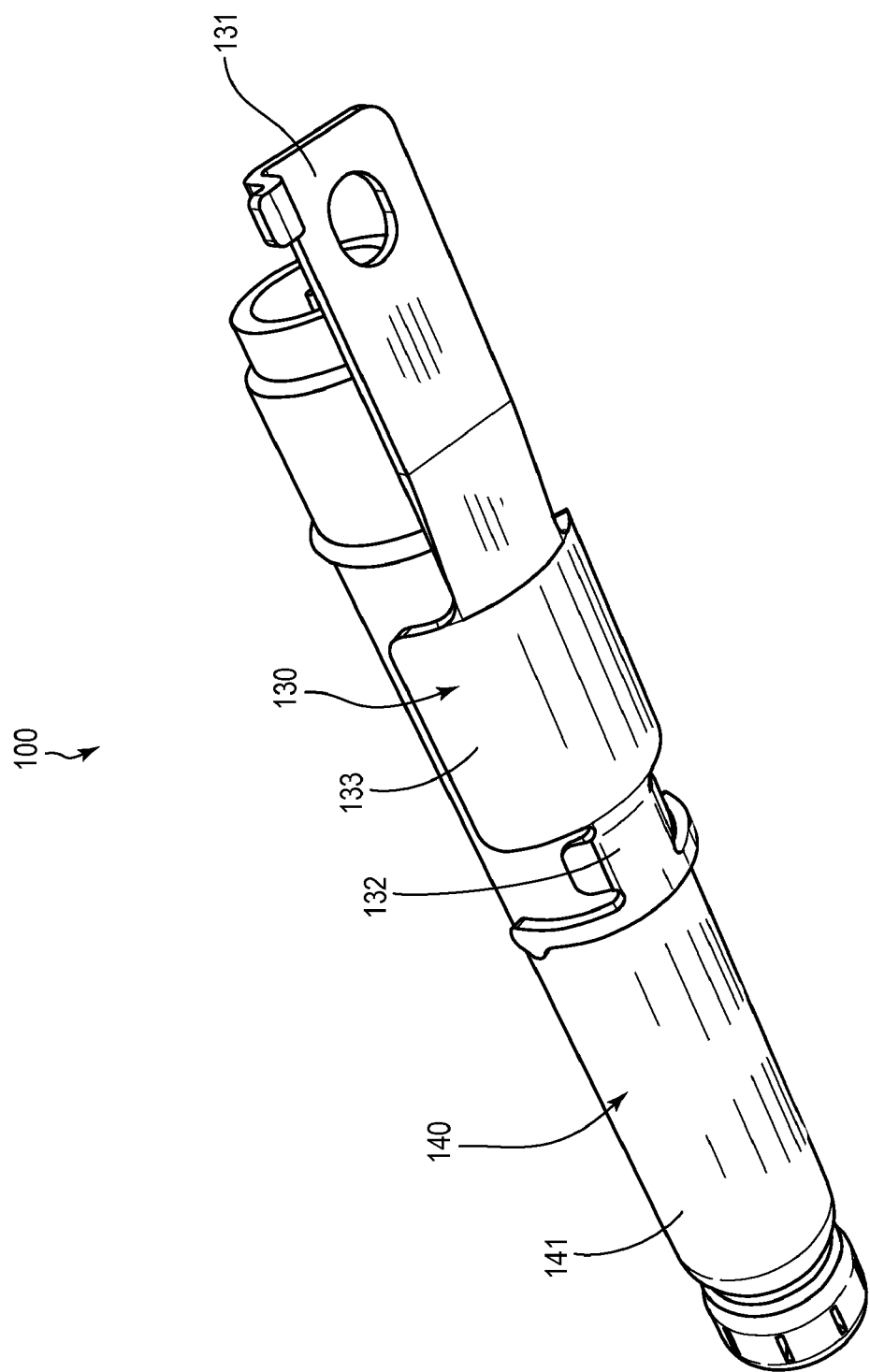
FIG. 2 is a perspective view of the inflator and inflator mounting bracket of FIG. 1A.
Figure 3:
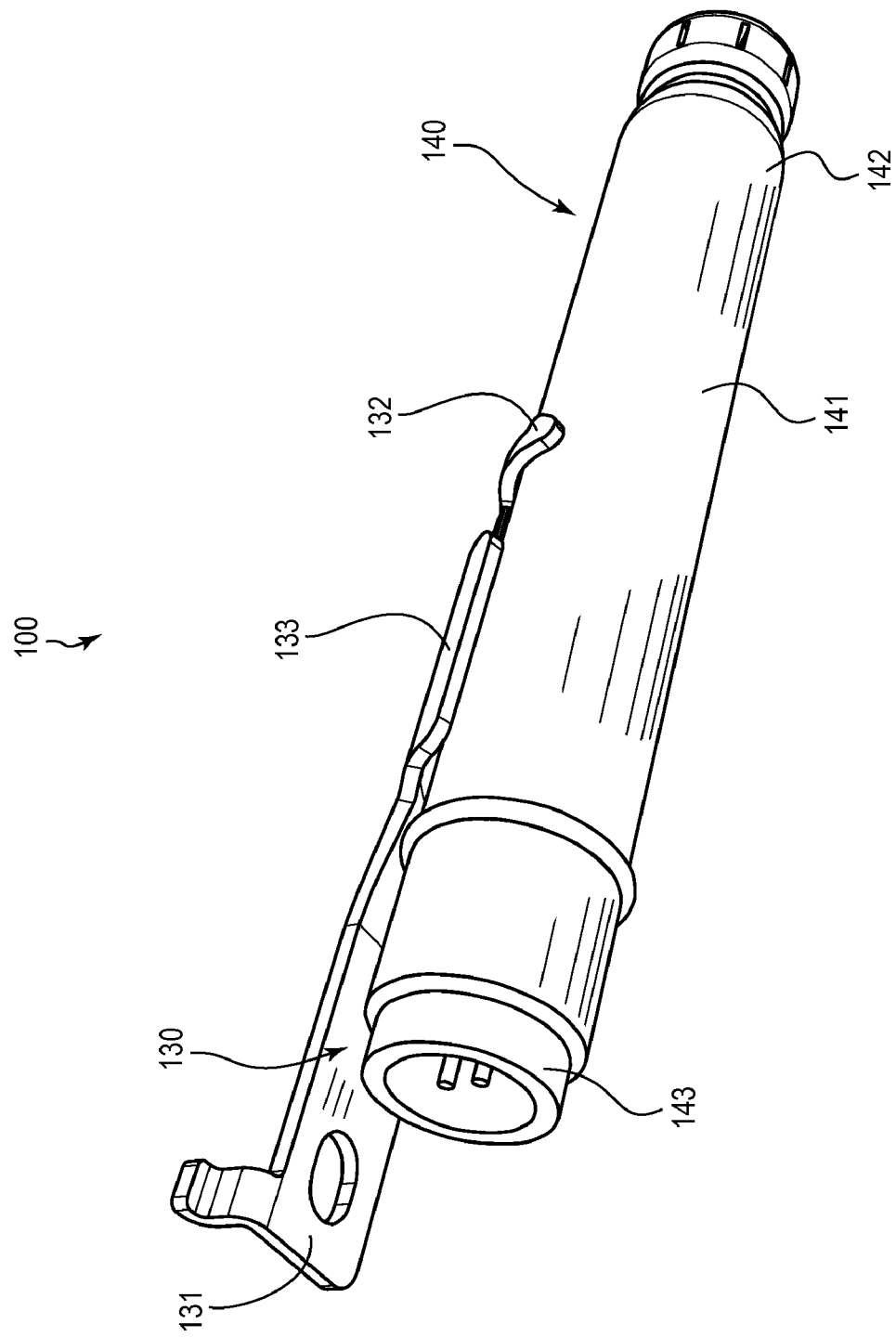
FIG. 3 is another perspective view of the inflator and inflator mounting bracket of FIG. 2.

FIGS. 2-3 are perspective views of inflator 140 and a mounting bracket 130, which are both components of airbag assembly 100. Inflator 140 may comprise a pyrotechnic, stored gas, or combination inflator, and comprises a tubular body portion 141, a gas-emitting end 142, and an electric connector on an opposite end 143. Inflator mounting bracket 130 may comprise a piece of metal, or a metal alloy, such as steel, and has an elongated, airbag distal region 131, an opposing airbag proximal region 132, and a central region 133. Airbag distal region 131 may comprise a substantially rectangular portion and may be said to have a planar shape. Airbag proximal region 132 may comprise a concave shape that is configured to partially wrap around tubular body 141 of inflator 140. In the depicted embodiment, mounting bracket 130 is configured to be coupled to inflator 140 via clamps; however in other embodiments, the mounting bracket may slide onto the inflator, or the mounting bracket may be pressed onto the inflator.

Figure 4:
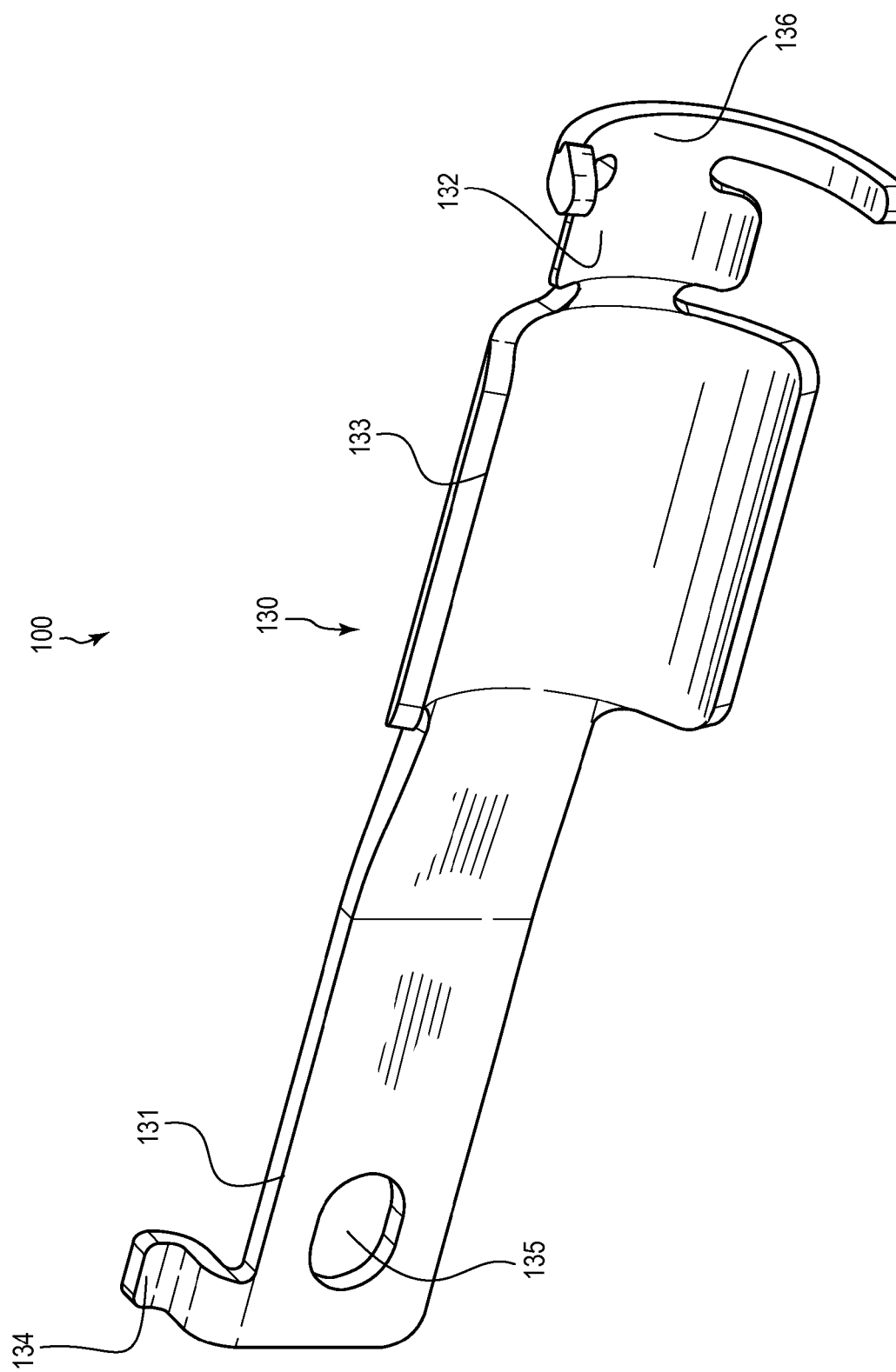
FIG. 4 is a perspective view of the inflator mounting bracket of FIG. 3.
Figure 5:
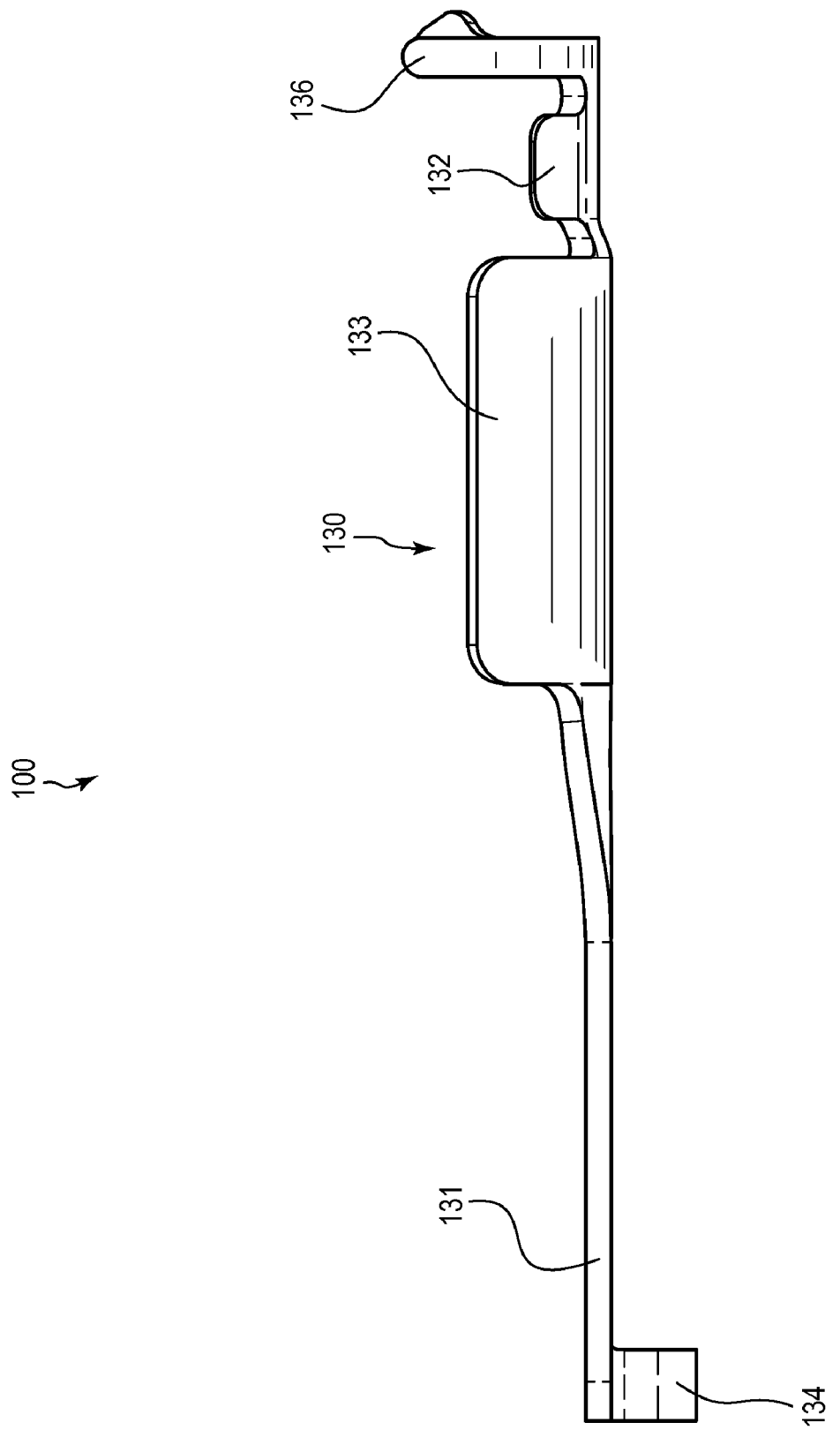
FIG. 5 is another perspective view of the inflator mounting bracket of FIG. 4.

FIGS. 4-5 are perspective views of inflator mounting bracket 130. As described above, the mounting bracket comprises airbag distal and proximal regions 131 and 132, as well as a central portion 133. Airbag central region 133 may be said to be part of airbag proximal region, and is not intended to imply a middle of inflator mounting bracket 130. Inflator mounting bracket 130 may comprise a planar portion and a curved portion. In the depicted embodiment, airbag distal region 131 may be said to be planar, and airbag proximal region 132 and central region 133 may each be said to be curved. Airbag proximal region and central region 132 and 133 each comprise a concave shape such that each of the regions can receive the tubular body of the inflator. A reduced width portion (identified at reference number 132) may be located between airbag distal region 132 and airbag central region 133. As such, the airbag proximal region of the inflator mounting bracket may comprise a first concave portion and a second concave portion that are separated by a reduced width portion. The reduced width portion may be employed to receive a clamp that is configured to retain the inflator mounting bracket in close association with the inflator. In the depicted embodiment, airbag distal region 131 comprises a tab 134 and an aperture 135, which are each optional features of mounting bracket 130. Tab 134 and aperture 135 are each examples of vehicle mounting structures; further, the combination of the tab and the aperture is an example of a vehicle mounting structure. Tab 134 may be described as an extension of distal region 131 of mounting bracket 130. Tab 134 may be configured to be received by a complementary feature on the roof rail of the vehicle, and aperture 135 may receive mounting hardware, such as a bolt, with which mounting bracket 130 may be partially mounted to the roof rail of the vehicle.

One skilled in the art will appreciate that a variety of shapes and types of inflator mounting brackets may be employed without departing from the spirit of the present invention. For example, the relative size, and/or shape of the mounting bracket may differ from the depicted embodiment. Further, the specific shape and/or features of the mounting bracket may differ from the depicted embodiment.

Figure 6:
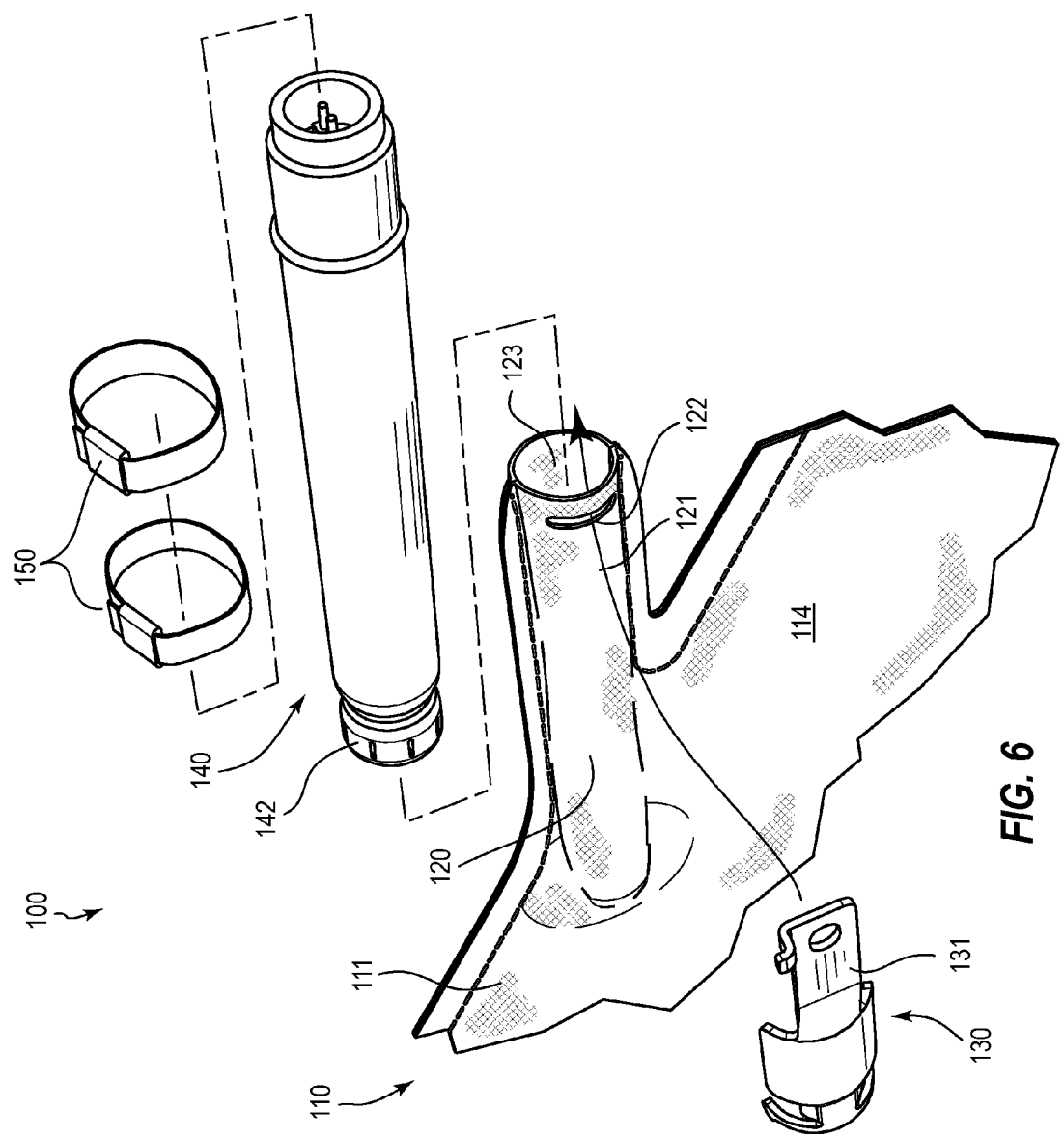
FIG. 6 is a close-up exploded perspective view of the airbag assembly of FIG. 1A.

FIG. 6 is an exploded perspective view of airbag assembly 100, which may comprise inflatable curtain airbag 110, inflator mounting bracket 130, inflator 140, and clamps 150. Upper portion 111 of airbag 110 may comprise a throat portion 120, which has a distal region 121 with an aperture 122 for receiving mounting bracket 130 and an inflator insert aperture 123. Aperture 122 may be called a "receiving aperture" and may comprise an elongated slot, which can be described as a "button hole". In other embodiments, aperture 122 may comprise an oval, rectangle, square, circle, or any other suitable shape. In the depicted embodiment, button hole 122 is located on rear face 114 of airbag 110. Button hole 122 is configured to receive distal end 131 of inflator mounting bracket 130. Inflator insert aperture 123 is configured to receive inflation gas emitting end 142 of inflator 140. Since inflator insert aperture 123 is contiguous with the inflatable void of inflatable curtain airbag 110, distal end 131 of mounting bracket 130 protrudes through rear face 114 of the airbag into the inflatable void of throat portion 120. Clamps 150 are configured to wrap around and/or slide over inflator 140, mounting bracket 130 and parts of throat 120.

Figure 7:
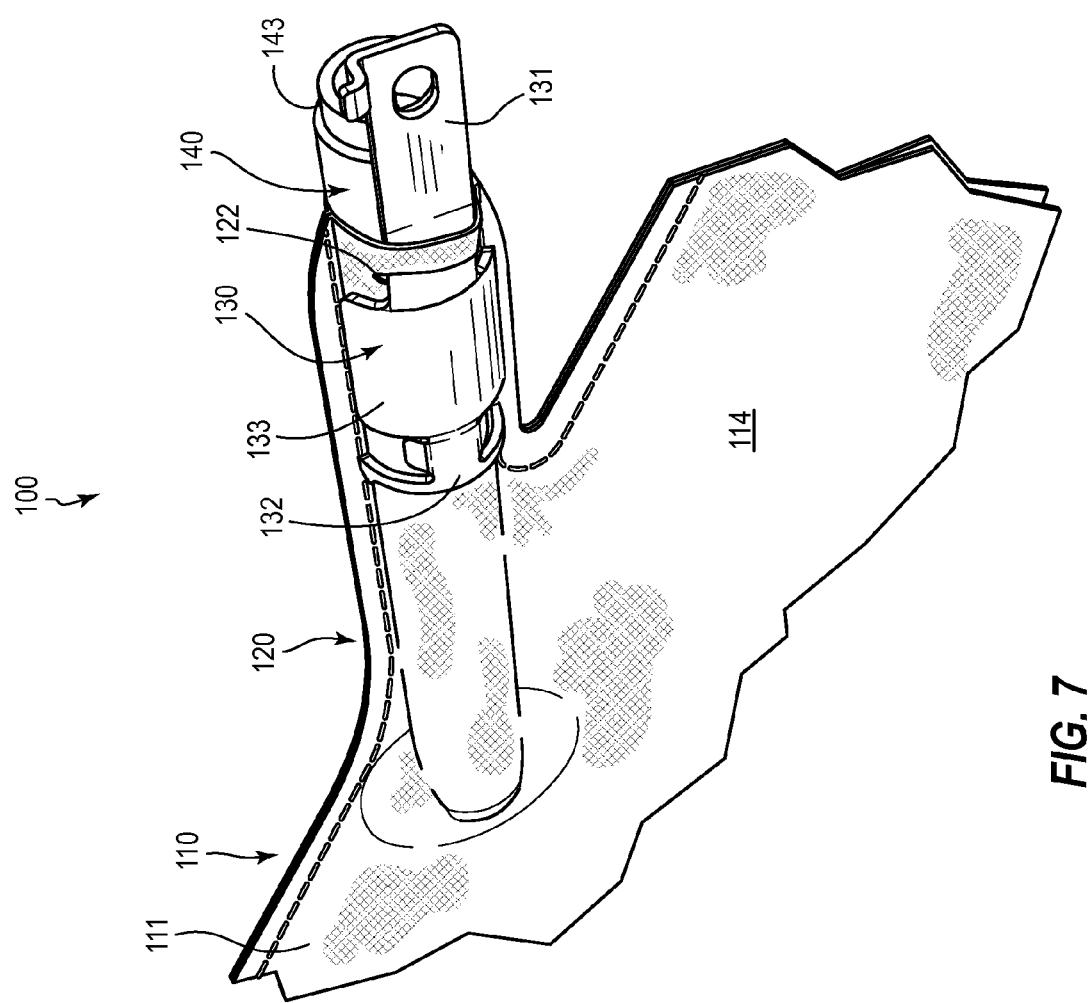
FIG. 7 is a perspective view of the airbag assembly of FIG. 6, after the airbag assembly has been assembled.
Figure 8:
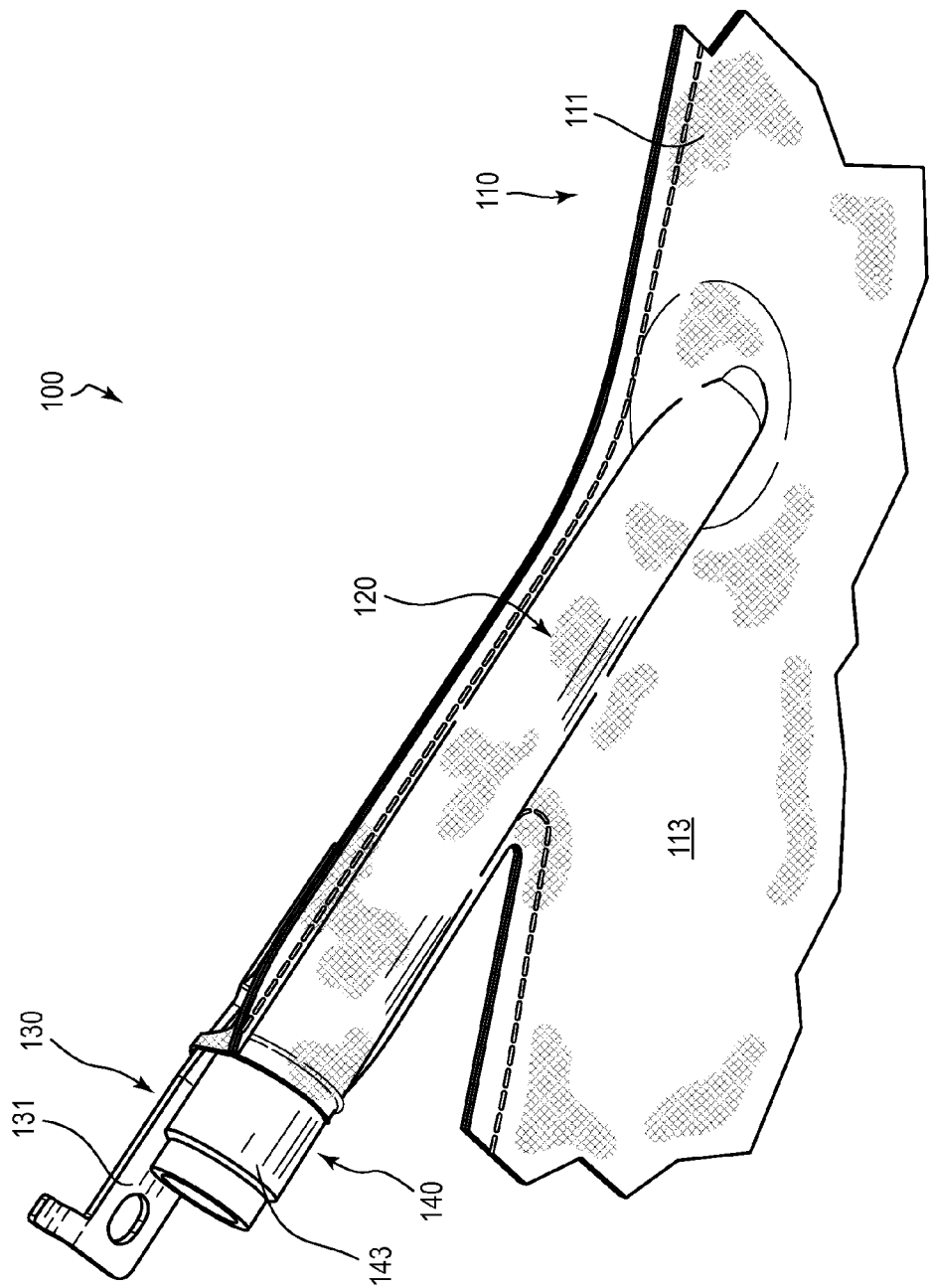
FIG. 8 is another perspective view of the airbag assembly of FIG. 7.

FIGS. 7-8 are perspective views of the airbag assembly of FIG. 6 after the assembly has been partially assembled, wherein FIG. 7 depicts a rear perspective view and FIG. 8 depicts a front perspective view. Throat portion 120 of upper portion 111 of airbag 110 is configured to receive inflator 140 such that distal end 143 extends out of the inflator insert aperture and the gas emitting end of the inflator is directed toward the inflatable void of the airbag. Airbag distal end 131 of inflator mounting bracket 130 protrudes through button hole 122, which is located on rear face 114 of airbag 110. In a coupled configuration, distal end 143 of inflator 140 is adjacent to distal region 131 of mounting bracket 130, and parts of throat portion 120 are located between the tubular body of inflator 140 and proximal and central regions 132 and 133 of the inflator mounting bracket. When mounted in a vehicle, front face 113 of throat portion 120 of inflatable curtain airbag 110 will be directed toward the passenger cabin of the vehicle and rear face 114 will be directed toward side widows of the vehicle.

Figure 9:
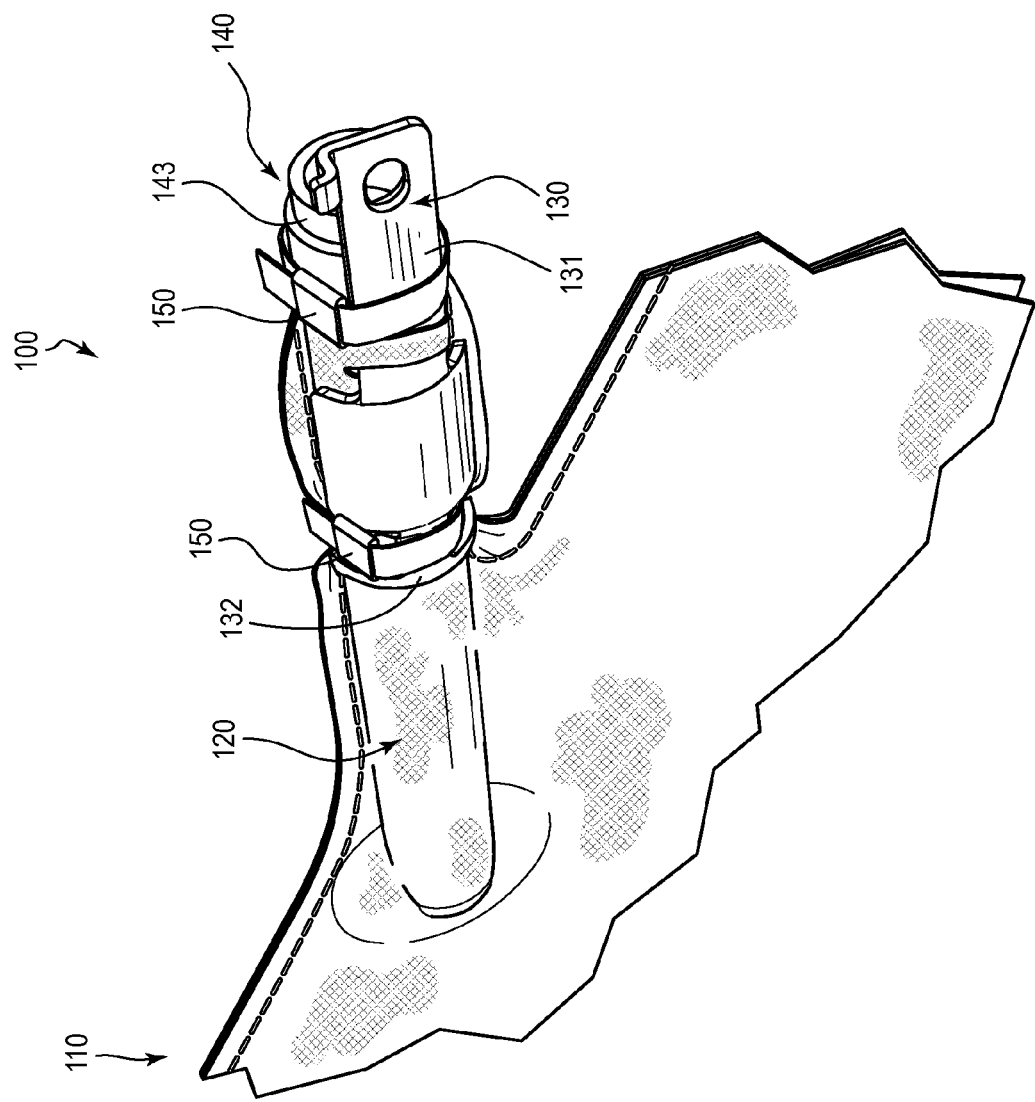
FIG. 9 is a perspective view of the airbag assembly of FIG. 7 after clamps have been employed to couple the inflator to the airbag.

FIG. 9 depicts the inflatable airbag assembly of FIGS. 7-8 after clamps 150 have been wrapped and/or slid over mounting bracket 130, inflator 140, and throat portion 120. Clamps 150 may comprise metal, plastic, or composite materials and may comprise screw clamps, metal bands that have a crimped piece that retains tensions in the bands, or a ratchet and rack type of clamp, such as a "zip tie". Further, clamps 150 may comprise mounting stems that protrude away from the clamps and aid in attaching the inflator and mounting bracket assembly to the roof rail of the vehicle. Inflator mounting bracket 130 may be configured such that clamps 150 are located in predetermined positions on the mounting bracket, and such that the predetermined positions comprise predetermined features that aid in retaining the clamps at the predetermined positions. In the depicted embodiment, one clamp 150 is located at distal region 131 of mounting bracket 130 and distal end 143 of inflator 140. Another clamp is located at proximal region 132 of mounting bracket 130. In other embodiments, more or fewer clamps may be employed.

Figure 10:
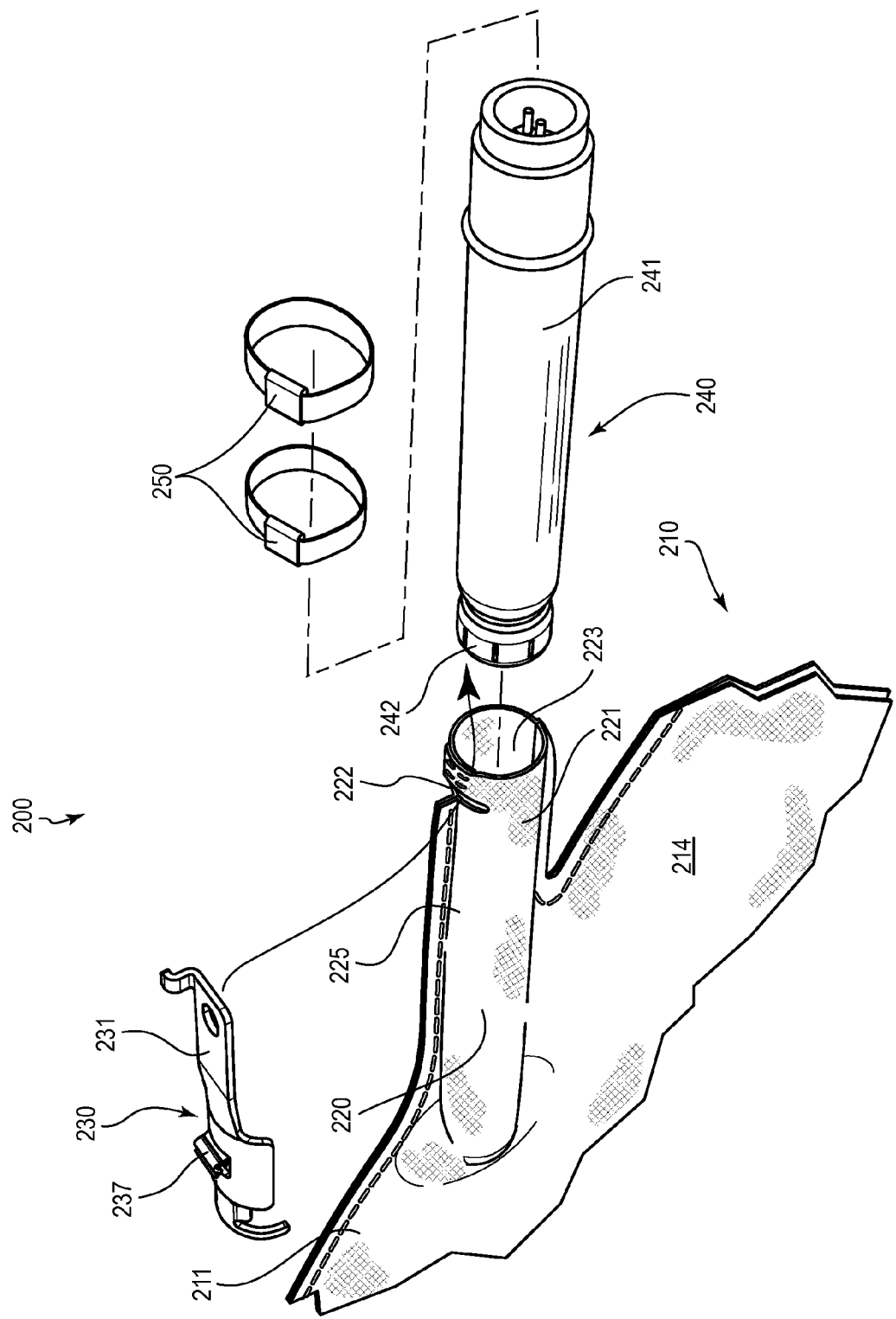
FIG. 10 is an exploded cutaway perspective view of another embodiment of an airbag assembly with a mounting bracket.

FIG. 10 is an exploded cutaway perspective view of another embodiment of an airbag assembly 200. Airbag assembly 200 and inflator mounting bracket 230 resemble airbag assembly 100 and inflator mounting bracket 130, described above, in certain respects. Accordingly, like features may be designated with like reference numerals, with the leading hundreds numeral incremented from "1" to "2". Any suitable combination of the features described with respect to airbag assembly 100 and inflator mounting bracket 130 can be employed with assembly 200 and inflator mounting bracket 230, and vice versa.

Assembly 200 may comprise an inflatable curtain airbag 210, an inflator mounting bracket 230, an inflator 240, and one or more clamps 250. Inflatable curtain airbag 210 is cutaway in the view of FIG. 10, such that an upper portion 211 of rear face 214 is visible. Upper portion 211 comprises a throat portion 220 that has a distal region with an aperture 222 on a top side 225. Inflator mounting bracket 230 comprises an airbag distal region 231 and a clip 237. Inflator 240 comprises a tubular body 241 that has a first end 242. Clamps 250 are configured to wrap around tubular body 241.

Airbag distal region 231 of inflator mounting bracket 230 is configured to be received by aperture 222, which may be described as a "button hole." First end 242 of inflator 240 may be placed within a void of throat portion 220 via inflator insert aperture 223. First end 242 may be received by inflator insert aperture 223 either before or after distal region 231 of bracket 230 is placed through button hole 222. Clamps 250 may be slid over tubular body 241 of inflator 240, or wrapped around the tubular body of the inflator.

Figure 11:
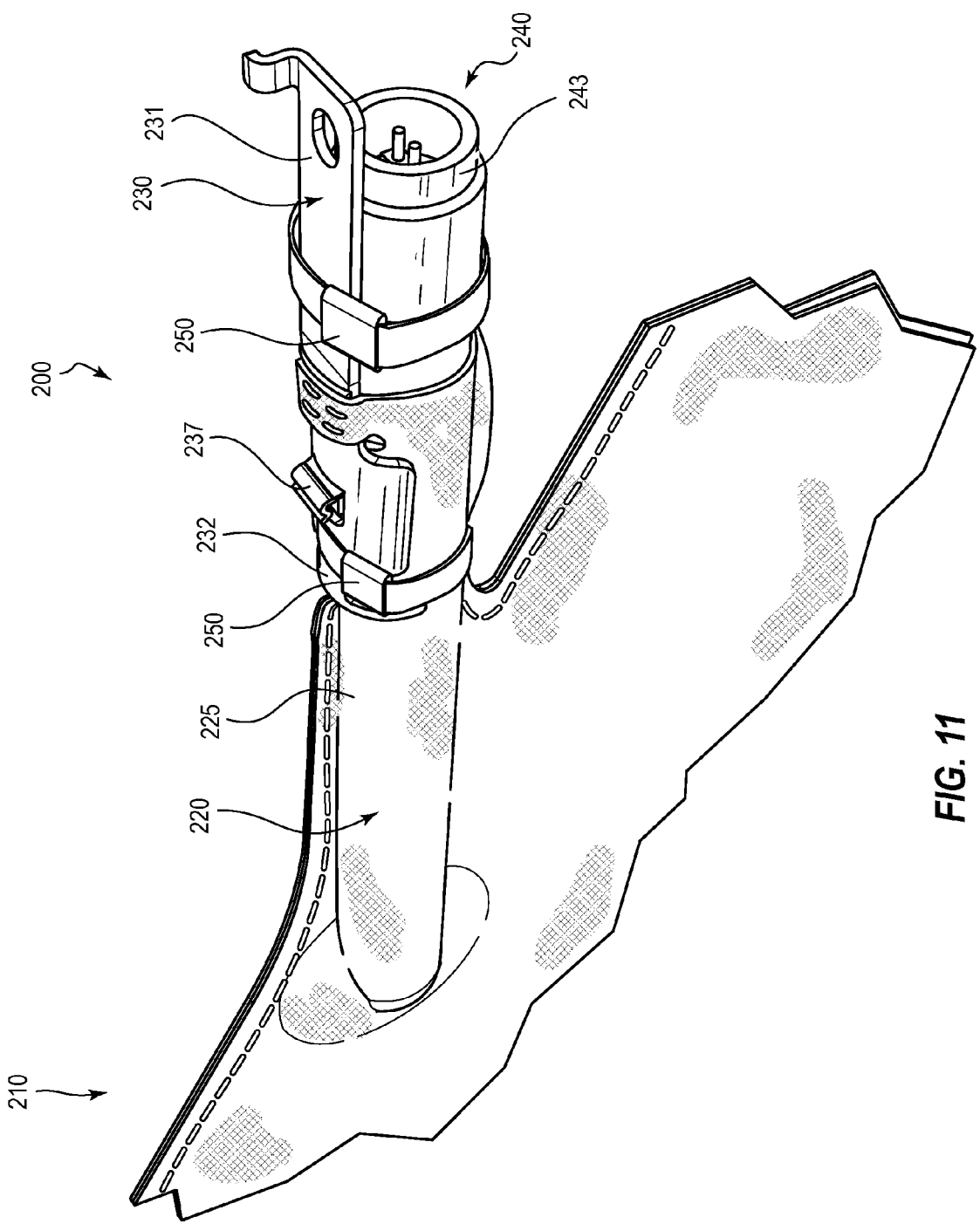
FIG. 11 is a perspective view of the airbag assembly of FIG. 10 after the assembly has been assembled.

FIG. 11 is a cutaway perspective view of airbag assembly 200 after the assembly has been assembled. Inflator mounting bracket 230 has been inserted through the button hole on top side 225 of throat portion 220 of airbag 210. Inflator 240 has been inserted into the inflator insert aperture of throat portion 220 such that a second end 243 of the inflator is still accessible. Clamps 250 have been placed over airbag distal and proximal regions 231 and 232 of inflator mounting bracket 230. Clamps 250 also extend around inflator 240. Clip 237 of inflator mounting bracket 230 is oriented such that it can interact with a complementary structure in a vehicle, and thereby aid in at least temporarily mounting inflator 240 and throat portion 220 in a vehicle. One skilled in the art will recognize that clip 237 may be used in other configurations of inflator mounting brackets and airbag throat portions. For example, the clip may be used in conjunction with an inflator mounting bracket coupled to a rear face, front face, or bottom side of an inflatable airbag. Similarly, the inflator mounting bracket itself, without the clip, may be coupled to the airbag at a variety of positions, including a front face or bottom side of the throat portion of the inflatable curtain airbag.

Figure 12:
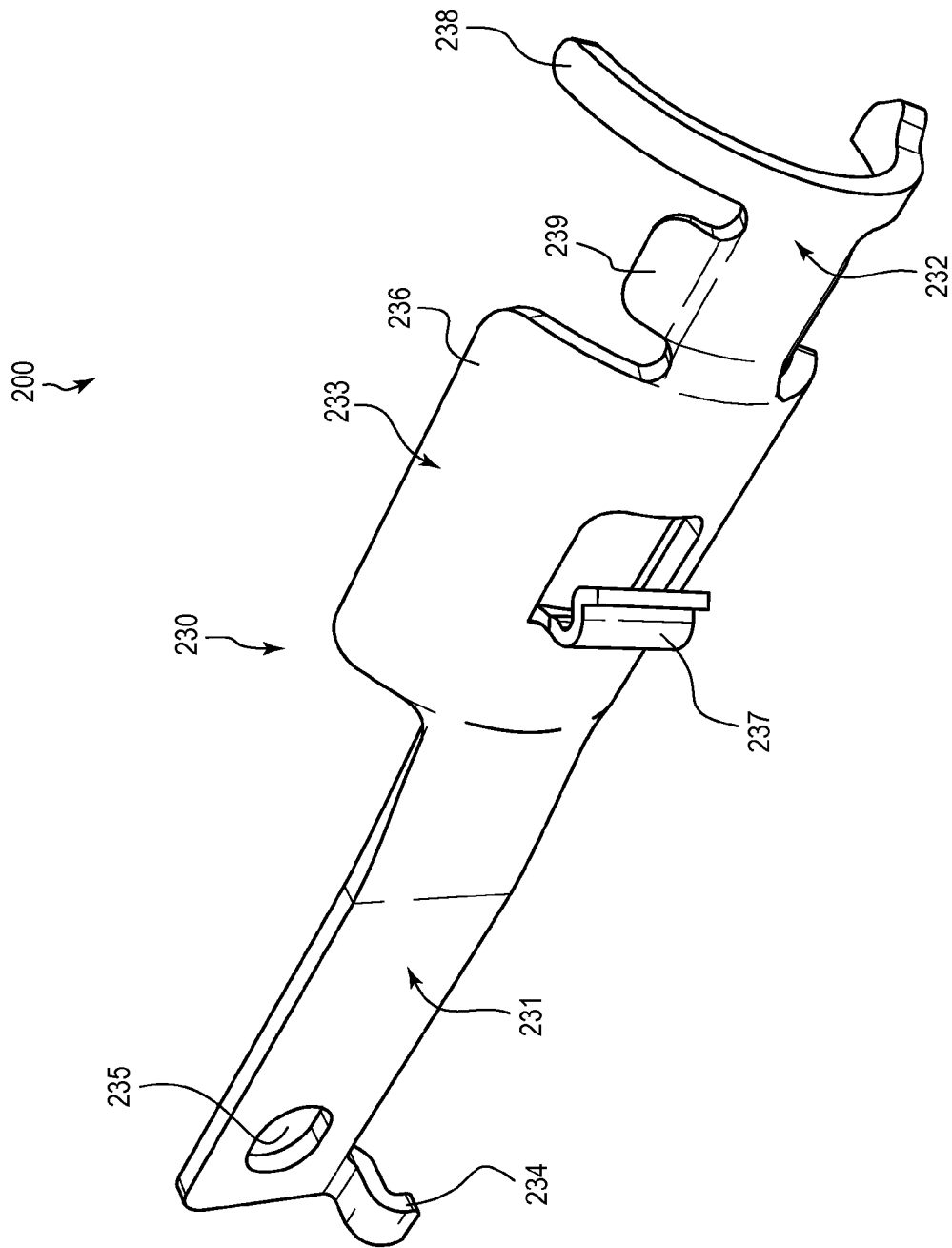
FIG. 12 is a perspective view of the inflator mounting bracket of FIG. 10.
Figure 13:
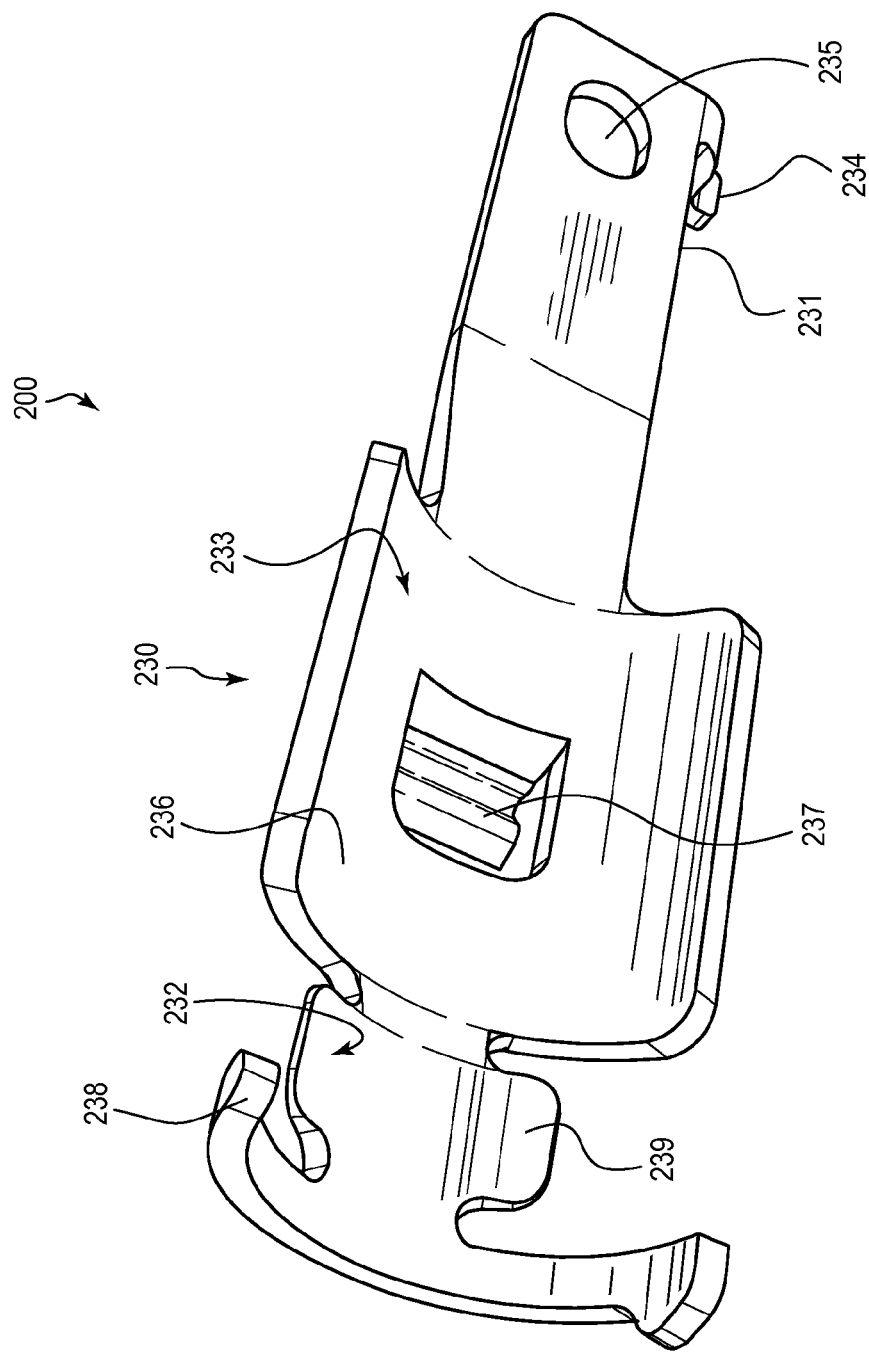
FIG. 13 is another perspective view of the mounting bracket of FIG. 10

FIGS. 12-13 are perspective views of inflator mounting bracket 230. As described above, the mounting bracket comprises airbag distal and proximal regions 231 and 232, as well as a central portion 233. Airbag central region 233 may be said to be part of airbag proximal region, and is not intended to imply a middle of inflator mounting bracket 230. Inflator mounting bracket 230 may comprise a planar portion and a curved portion. In the depicted embodiment, airbag distal region 231 may be said to be planar, and airbag proximal region 232 and central region 233 may each be said to be curved. Airbag proximal region and central region 232 and 233 each comprise a concave shape such that each of the regions can receive the tubular body of the inflator. A reduced width portion 239 may be located between airbag distal region 232 and airbag central region 233. As such, the airbag proximal region of the inflator mounting bracket may comprise a first concave 236 portion and a second concave portion 238 that are separated by reduced width portion 239. Reduced width 239 portion may be employed to receive a clamp that is configured to retain the inflator mounting bracket in close association with the inflator.

In the depicted embodiment, airbag distal region 231 comprises a tab 234 and an aperture 235, which are each optional features of mounting bracket 230. Tab 234 and aperture 235 are each examples of vehicle mounting structures; further, the combination of the tab and the aperture is an example of a vehicle mounting structure. Tab 234 may be described as an extension of distal region 231 of mounting bracket 230. Tab 234 may be configured to be received by a complementary feature on the roof rail of the vehicle, and aperture 235 may receive mounting hardware, such as a bolt, with which mounting bracket 230 may be partially mounted to the roof rail of the vehicle. Clip 237 may also be employed to coupled mounting bracket 230 to an vehicle structure, wherein the clip is configured to interact with a complementary structure on the vehicle.

One skilled in the art will appreciate that a variety of shapes and types of inflator mounting brackets may be employed without departing from the spirit of the present invention. For example, the relative size, and/or shape of the mounting bracket may differ from the depicted embodiment. Further, the specific shape and/or features of the mounting bracket may differ from the depicted embodiment.

Any methods disclosed herein comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Reference throughout this specification to "an embodiment" or "the embodiment" means that a particular feature, structure or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, as the following claims reflect, inventive aspects lie in a combination of fewer than all features of any single foregoing disclosed embodiment. Thus, the claims following this Detailed Description are hereby expressly incorporated into this Detailed Description, with each claim standing on its own as a separate embodiment. This disclosure includes all permutations of the independent claims with their dependent claims.

Recitation in the claims of the term "first" with respect to a feature or element does not necessarily imply the existence of a second or additional such feature or element. Elements recited in means-plus-function format are intended to be construed in accordance with 35 U.S.C. §112 ¶ 6. It will be apparent to those having skill in the art that changes may be made to the details of the above-described embodiments without departing from the underlying principles of the invention. Embodiments of the invention in which an exclusive property or privilege is claimed are defined as follows.

The invention claimed is:

1. An inflatable airbag assembly, comprising:
   an inflatable curtain airbag having a throat portion that comprises an inflator insert aperture that is contiguous with an inflatable void of the inflatable airbag, wherein the throat portion also comprises a receiving aperture;
   an inflator positioned at the throat portion of the inflatable curtain airbag, wherein the inflator is located within the throat portion of the inflatable curtain airbag;
   an inflator mounting bracket that is a separate component relative to the inflatable curtain airbag and the inflator, wherein the inflator mounting bracket extends through the receiving aperture of the inflatable curtain airbag such that the inflator mountain bracket extends through the throat portion of the inflatable curtain airbag and along the inflator and such that part of the throat portion of inflatable curtain airbag is between a portion of the inflator mounting bracket and the inflator; and,
   a clamp that wraps around the inflator mounting bracket and the inflator, such that the inflator mounting bracket is secured to the inflator.

2. The inflatable airbag assembly of claim 1, wherein the inflator mounting bracket comprises an airbag proximal region that partially wraps around a portion of the inflator.

3. The inflatable airbag assembly of claim 1, wherein the inflator mounting bracket is configured to couple the inflator to a roof rail of a vehicle.

4. The inflatable airbag assembly of claim 1, wherein the inflator mounting bracket comprises an airbag proximal region and an airbag distal region, wherein the distal region extends through the receiving aperture into the throat portion, and the airbag proximal region does not extend into the throat portion.

5. An inflatable airbag assembly, comprising:
   an inflatable curtain airbag having a throat portion that comprises an inflator insert aperture that is contiguous with an inflatable void of the inflatable airbag, wherein the throat portion also comprises a receiving aperture;
   an inflator positioned at the throat portion of the inflatable curtain airbag, wherein the inflator comprises a gas emitting end that is located within the throat portion of the inflatable curtain airbag, a tubular body portion, and an electrical connection end;
   an inflator mounting bracket comprising an airbag proximal region and an airbag distal region, wherein the airbag distal region extends through the receiving aperture in the inflatable curtain airbag, wherein the airbag proximal region that comprises a concave portion that partially wraps around a portion of the tubular body of the inflator, and a central region that comprises a concave portion that partially wraps around a portion of the tubular body of the inflator; and,
   a first clamp that wraps around the inflator mounting bracket and the inflator.

6. The inflatable airbag assembly of claim 5, further comprising a second clamp located between the concave portions of the airbag proximal region and the central region of the inflator mounting bracket.

7. The inflatable airbag assembly of claim 6, wherein the first clamp is located between the concave portion of the central region and the airbag distal region.

8. The inflatable airbag assembly of claim 5, wherein the airbag distal region of the mounting bracket extends beyond the throat portion of the inflatable curtain airbag such that airbag distal region of the mounting bracket abuts the inflator.

9. The inflatable airbag assembly of claim 8, wherein the airbag distal region of the inflator mounting bracket is located adjacent to the electrical connector end of inflator.

10. The inflatable airbag assembly of claim 9, wherein the airbag distal region of the mounting bracket extends beyond the electrical connection end of the inflator.

11. The inflatable airbag assembly of claim 5, wherein part of the throat portion of the airbag is located between the inflator and airbag proximal region of the inflator mounting bracket.

12. The inflatable airbag assembly of claim 5, wherein the inflator mounting bracket and receiving aperture are located on a top side of the throat portion of the inflatable curtain airbag.

13. The inflatable airbag assembly of claim 5, wherein the inflator mounting bracket further comprises a clip that extends from the central region of the inflator mounting bracket, and wherein the clip comprises an extension of the inflator mounting bracket.

14. An inflatable airbag assembly
   an inflatable curtain airbag having a throat portion that comprises an inflator insert aperture that is contiguous with an inflatable void of the inflatable airbag, wherein the throat portion also comprises a receiving aperture located on a rear face of the throat portion;
   an inflator positioned at the throat portion of the inflatable curtain airbag;
   an inflator mounting bracket, wherein the inflator mounting bracket comprises an airbag distal region and an airbag proximal region, and wherein the inflator mounting bracket extends through the receiving aperture in the inflatable curtain airbag such that the airbag distal region of the inflator mounting bracket extends within the throat portion of the inflatable curtain airbag and along the inflator and such that part of the throat portion of inflatable curtain airbag is between the airbag proximal region of the inflator mounting bracket and the inflator,
   a first clamp that wraps around the inflator mounting bracket and the inflator but not the throat portion of the inflatable curtain airbag, and
   a second clamp that wraps around the inflator mounting bracket, the throat portion of the inflatable curtain airbag and the inflator.

15. The inflatable airbag assembly of claim 14, wherein the airbag distal region of the inflator mounting bracket further comprises a vehicle mounting structure with an aperture.

16. The inflatable airbag assembly of claim 15, wherein the vehicle mounting structure is configured to be received by an aperture in a vehicle.

17. The inflatable airbag assembly of claim 14, wherein the airbag distal region extends beyond the inflator insert aperture.

18. The inflatable airbag assembly of claim 14, wherein the airbag proximal region has a concave portion, which partially wraps around a portion of a tubular body of the inflator, and a central region that comprises a concave portion, which partially wraps around a portion of the tubular body of the inflator.

19. The inflatable airbag assembly of claim 18, wherein the second clamp is located between the concave portion of the airbag proximal region and the central region of the inflator mounting bracket.

20. The inflatable airbag assembly of claim 18, wherein the first clamp is located between the concave portion of the central region and the airbag distal region.

21. The inflatable airbag assembly of claim 14, wherein the inflator mounting bracket comprises a planar portion and a curved portion.

22. The inflatable airbag assembly of claim 21, wherein the inflator mounting bracket comprises a reduced width portion that is located on the airbag proximal region and is located between a first concave portion and a second concave portion.

23. The inflatable airbag assembly of claim 22, wherein the second clamp is located at the reduced width portion of the airbag proximal region of the inflator mounting bracket.

24. The inflatable airbag assembly of claim 14, wherein the inflator mounting bracket and receiving aperture are located on a top side of the throat portion of the inflatable curtain airbag.

25. The inflatable airbag assembly of claim 14, wherein the inflator mounting bracket further comprises a clip that extends from a central region of the inflator mounting bracket, and wherein the clip comprises an extension of the inflator mounting bracket.

* * * * *